United States Patent
Zhang (10) Patent No.: US 9,924,237 B2
(45) Date of Patent: Mar. 20, 2018

(54) NETWORK MEDIA INFORMATION DELIVERY CONTROLLING METHOD, APPARATUS AND SYSTEM

(71) Applicant: TENCENT TECHNOLOGY (SHENZHEN) COMPANY LIMITED, Shenzhen (CN)

(72) Inventor: Jingjing Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/172,222

(22) Filed: Jun. 3, 2016

(65) Prior Publication Data

US 2016/0286280 A1 Sep. 29, 2016

Related U.S. Application Data

(63) Continuation of application No. PCT/CN2015/072198, filed on Feb. 14, 2015.

(30) Foreign Application Priority Data

Dec. 5, 2013 (CN) .......................... 2013 1 0652857

(51) Int. Cl.
*H04N 21/433* (2011.01)
*H04N 21/431* (2011.01)
(Continued)

(52) U.S. Cl.
CPC .......... *H04N 21/812* (2013.01); *G06Q 30/02* (2013.01); *G06Q 30/0269* (2013.01);
(Continued)

(58) Field of Classification Search
CPC .......... H04N 21/4333; H04N 21/4316; H04N 21/812; H04N 21/2668; H04N 21/4532;
(Continued)

(56) References Cited

U.S. PATENT DOCUMENTS 9,628,575 B1 * 4/2017 Lewis .................... H04L 67/22
2014/0052785 A1 * 2/2014 Sirpal .................... G06F 3/017
709/204
(Continued)

FOREIGN PATENT DOCUMENTS

| CN | 101383937 A | 3/2009 |
| CN | 101399682 A | 4/2009 |

(Continued)

OTHER PUBLICATIONS

Search Report in International Application No. PCT/CN2015/072198 dated Apr. 28, 2015, 4 pages.
(Continued)

*Primary Examiner* — Pinkal R Chokshi
(74) *Attorney, Agent, or Firm* — Marshall, Gerstein & Borun LLP (57) ABSTRACT

The present invention discloses a network media information delivery controlling method. In the method, a computing device obtains network media information after a pause operation for a video is detected, obtains social element data corresponding to the network media information according to a login state of a user, and displays the network media information and the social element data corresponding to the network media information on a pause interface of the video. According to the present disclosure, attention for pause network media information of a video is improved, and waste for machines and network resources are reduced.

16 Claims, 4 Drawing Sheets

(51) Int. Cl.
*H04N 21/81* (2011.01)
*G06Q 30/02* (2012.01)
*G06Q 50/00* (2012.01)
*H04L 29/08* (2006.01)
*H04N 21/2668* (2011.01)
*H04N 21/45* (2011.01)
*H04N 21/472* (2011.01)
*H04N 21/488* (2011.01)
*H04N 21/4782* (2011.01)
*H04N 21/61* (2011.01)

(52) U.S. Cl.
CPC ............. *G06Q 50/01* (2013.01); *H04L 67/02* (2013.01); *H04L 67/306* (2013.01); *H04N 21/2668* (2013.01); *H04N 21/4316* (2013.01); *H04N 21/4333* (2013.01); *H04N 21/4532* (2013.01); *H04N 21/47217* (2013.01); *H04N 21/4882* (2013.01); *H04N 21/4782* (2013.01); *H04N 21/6125* (2013.01)

(58) Field of Classification Search
CPC ........... H04N 21/4782; H04N 21/6125; H04N 21/47217
See application file for complete search history.

(56) References Cited

U.S. PATENT DOCUMENTS

| | | | | |
|---|---|---|---|---|
| 2014/0067828 | A1* | 3/2014 | Archibong | H04L 65/4084 707/748 |
| 2014/0089017 | A1* | 3/2014 | Klappert | G06Q 10/02 705/5 |
| 2014/0255003 | A1* | 9/2014 | Abramson | G06F 17/30247 386/240 |
| 2014/0280564 | A1* | 9/2014 | Darling | G06Q 50/01 709/204 |
| 2014/0325359 | A1* | 10/2014 | Vehovsky | H04N 9/8205 715/723 |
| 2014/0331258 | A1* | 11/2014 | Foote | H04W 4/206 725/34 |
| 2015/0071601 | A1* | 3/2015 | Dabous | G06Q 30/02 386/230 |
| 2015/0350729 | A1* | 12/2015 | Reynolds | H04N 21/4668 725/34 |
| 2016/0192011 | A1* | 6/2016 | Toh | G06F 3/0481 725/37 |
| 2017/0302974 | A1* | 10/2017 | Papish | H04N 21/23424 |

FOREIGN PATENT DOCUMENTS

| | | |
|---|---|---|
| CN | 102223568 A | 10/2011 |
| CN | 102426685 A | 4/2012 |
| CN | 102542494 A | 7/2012 |
| CN | 102737684 A | 10/2012 |
| CN | 102930669 A | 2/2013 |
| KR | 2012-0071680 A | 7/2012 |
| KR | 2012-0076038 A | 7/2012 |
| WO | WO-2004/047433 A1 | 6/2004 |

OTHER PUBLICATIONS

International Preliminary Report on Patentability and Written Opinion in International Application No. PCT/CN2015/072198 dated Jun. 7, 2016, 8 pages.

Office Action in CN Application No. 201310652857.7 dated Nov. 29, 2017, 9 pages.

* cited by examiner

NETWORK MEDIA INFORMATION DELIVERY CONTROLLING METHOD, APPARATUS AND SYSTEM

This application is a continuation of Application No. PCT/CN2015/072198, filed on Feb. 4, 2015. This application claims the benefit and priority to of Chinese Patent Application No. 201310652857.7, entitled "network media information delivery controlling method, apparatus and system" and filed on Dec. 5, 2013. The entire disclosures of each of the above applications contents of all of which are incorporated herein by reference in their entirety for all purposes.

FIELD OF THE INVENTION

The present disclosure relates to network data processing technologies, and more particularly, to a network media information delivery controlling method, apparatus and system.

BACKGROUND OF THE INVENTION

Network media information is a variety of information that which takes a numeric code as a carrier and is issued through various display forms (e.g., a webpage, a client interface, etc.). The network media information usually corresponds to a target webpage, when a user clicks the network media information, the target webpage is jumped to, and content of the target webpage is displayed for the user. At present, more attention is paid to fields how the network media information is effectively delivered to particular audiences and how the displayed information is effectively managed.

Network media information processing and displaying technologies have been developed very fast in recent years, and have been used in a great amount of fields, e.g., in an internet advertisement processing and displaying field, where the network advertisement is a kind of the network media information. A network media information delivery controlling technology is an important technology in the network media information processing and displaying technologies.

SUMMARY OF THE INVENTION

The present disclosure provides a network media information delivery controlling method, apparatus and system, so as to improve attention for pause network media information of a video and to reduce waste for machines and network resources.

A network media information delivery controlling method includes:

obtaining, by a computing device, network media information after a pause operation for a video is detected;

obtaining, by the computing device, social element data corresponding to the network media information according to a login state of a user; and displaying, by the computing device, the network media information and the social element data corresponding to the network media information on a pause interface of the video.

A network media information delivery controlling apparatus, comprising:

one or more processors;

a memory;

instructions, stored in the memory and executed by the one or more processors, comprising:

an information obtaining module, to obtain network media information after a pause operation for a video is detected, obtain social element data corresponding to the network media information according to a login state of a user; and a displaying module, to display the network media information and the social element data corresponding to the network media information on a pause interface of the video.

A non-transitory computer readable storage medium for storing instructions is further provided to execute the method above.

It can be seen from above that after a pause operation for a video is detected, a computing device obtains network media information, obtains social element data corresponding to the network media information according to a login state of a user, and displays the network media information and the social element data corresponding to the network media information on a pause interface of the video. Thus, it is avoided to blindly click the network media information and/or to blindly participate in the network media information, and occupancy for machine resources (e.g., storage resources, computing resources etc.) and occupancy for network resources (e.g., bandwidth resources, network device resources etc.) are further reduced, and waste for the machines and the network resources are reduced.

DETAILED DESCRIPTION OF THE INVENTION

In a network media information delivery controlling system, network media information may be displayed during a video. In particular, in a video displaying process, if it is detected that a user triggers a pause operation, the network media information corresponding to the video is obtained from a network side, the obtained network media information is displayed on a pause page. Thus, the network media information delivered by a provider can displayed for a user, a network media information delivery way is increased, and target audience coverage rate is increased. However, current pause network media information of a video mainly includes a static picture, or a short video (e.g., a shock wave flash (SWF) or a flash video (FLV)) or a dynamic FLASH image, in which only the content delivered by the provider is displayed, thus, user acceptance is poor, there is no effective interaction with the user, and it is caused that the user watches the pause network media information in a short time period, and attention is low. Since the attention is low, in order to deliver the network media information enough to cover specific target audiences, the provider may increase the delivery amount of the network media information, so as to cause waste of network media information delivery and occupy a great amount of machine resources (e.g., storage resources, computing resources etc.) and network resources (e.g., bandwidth resources, network device resources etc.). Thus, the existing network media information delivery technology for the video cannot satisfy requirements of the network media information provider, attention for the delivered pause network media information for video is low and the provider has to blindly increase the delivery amount, which will cause waste for the machines and the network resources.

The present disclosure is further described in detail in conjunction with the accompanying drawings and examples.

Figure 1:
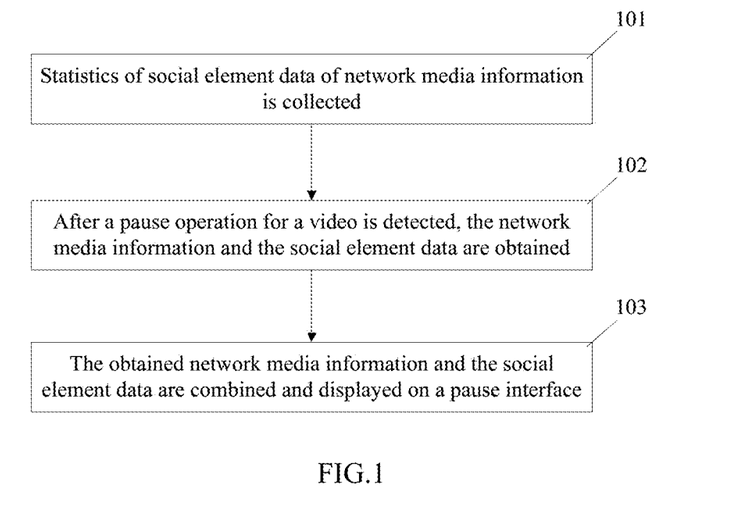
FIG. 1 is a flowchart illustrating a network media information delivery controlling method according to some examples of the present disclosure.

FIG. 1 is a flowchart illustrating a network media information delivery controlling method according to some examples of the present disclosure. As shown in FIG. 1, the method includes procedures as follows.

At block 101, statistics of social element data of network media information is collected.

At block 102, after a pause operation for a video is detected, the network media information and the social element data are obtained.

At block 103, the obtained network media information and the social element data are combined and displayed on a pause interface.

In some examples, the social element data of the network media information may include the number of users clicking the network media information. A target page corresponding to the network media information may be an information entity needing user participation. For example, the information entity may be an activity interface needing the user participation, and when the user clicks to participate in the activity, user information is added into a database of the activity. For another example, the information entity may be participation software (e.g., chorus software), and when the user clicks for participation, the user is added into the database of the participation software, so as to use functions of the software. If the target page of the network media information is the information entity needing the user participation, the social element data of the network media information may include the number of users clicking the network media information and/or the number of users participating in the information entity. The user participation includes that the user clicks the network media information to jump to a target interface, and further submits participation information to a background system on the target interface, e.g., the participation information includes a user name, an address and a participation instruction etc. A background system for the target interface forwards the user participation information to the network media information delivery controlling system in the present disclosure, and the network media information delivery controlling system collects statistics of the number of the users participating in the information entity.

In some examples, social element data of the network media information includes social element data related to the user or general social element data. The general social element data includes the number of the users clicking the network media information. If the target page of the network media information includes the information entity for the user participation, the general social element data includes the number of the users clicking the network media information and/or the number of the users participating in the information entity. The social element data related to the user includes user attribute information, the number of friends clicking the network media information. If the target page of the network media information includes the information entity needing the user participation, the social element data corresponding to the user may further include the number of friends participating in the information entity.

The process of combining and displaying the obtained network media information and the social element data on the social element display area includes displaying the social element display area at a designated location, displaying preset template information in the social element display area, and adding the social element data into a corresponding location in the template information.

Figure 2:
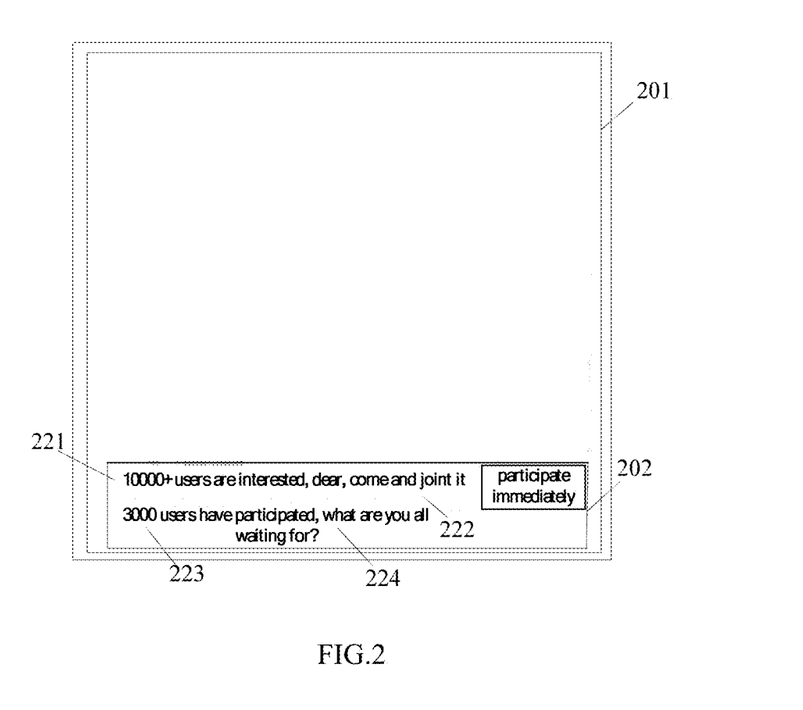
FIG. 2 is a schematic diagram illustrating a pause interface in which network media information and social element data of the network media information are combined and displayed according to some examples of the present disclosure.

FIG. 2 is a schematic diagram illustrating a pause interface in which network media information and social element data of the network media information are combined and displayed according to some examples of the present disclosure. As shown in FIG. 2, a social element display area 202 is at a designated location of the pause interface of the video, e.g., under a network media information display area 201 (in which the network media information is displayed). It should be noted that the social element display area may be at another location, which is not limited in the present disclosure. The social element data of the network media information is displayed in the social element display area 202, and the social element displaying area 202 includes the number of users clicking the network media information 221 and the preset template information 222. For example, in the present disclosure, a user interested is a user clicking the network media information. The template information 222 in the present disclosure includes "A+users are interested, B, Come and join it", wherein A is the number of users clicking the network media information, when the number of the users clicking the network media information is obtained, it is added to the location of A. The B is a name of a user being watching the video. If the user does not log in the website providing the video, a general term (e.g., "dear") is added at the location of B. If the user has logged in the website providing the video, a user name of the user is added at the location of B. The template information may be preset by an administrator.

In addition, since the network media information displayed in the network media information displaying area 201 in FIG. 2 may be the information entity for the user participation, the number of users participating in the information entity 223 and the preset template information 224 are further displayed in the social element display area 202. The template information in this example is "C users have participated, what are you all waiting for?", wherein C is the number of the users participating in the information entity, the obtained number of the users participating in the information entity is added at the location of C.

In some examples, the process of collecting statistics of the social element data of network media information includes collecting statistics of the number of the users clicking the network media information, and recording a user identifier of a respective user clicking the network media information. If the target page of the network media information is the information entity needing the user participation, the process of collecting statistics of the social element data of network media information includes collecting statistics of the number of the users participating in the information entity, and further recording a user identifier of a respective user participating in the information entity. When the social element data is combined and displayed, it is determined whether the user watching the current video is logged in. If not, the number of users clicking the network media information and/or the number of users participating in the information entity are displayed. If yes, a relationship chain data of the logged-in user is obtained, an intersection between identifiers of friends in the relationship chain and the identifiers of users clicking the network media information and/or an intersection between the identifiers of the friends in the relationship chain and the identifiers of the users participating in the information entity are queried, and the number of friends clicking the network media information and/or the number of friends participating in the information entity are displayed.

If the user watching the current video has logged in, the method further includes obtaining attribute information of the user, and displaying the attribute information of the logged-in user on the pause interface.

In some examples, after a pause operation for the video is detected, a computing device obtains the network media information. According to the login state of the user, the computing device obtains the social element data corresponding to the network media information. In particular, if the login state is that the user has logged in the website providing the video, the computing device obtains the social element data related to the user, if the login state is that the user does not log in the website providing the video, the computing device obtains the general social element data.

The computing device displays the network media information in the network media information display area on the pause interface of the video. According to the user's login state, the corresponding template information is selected. The computing device adds the obtained social element data into a designated location in the template information for display.

Figure 3:
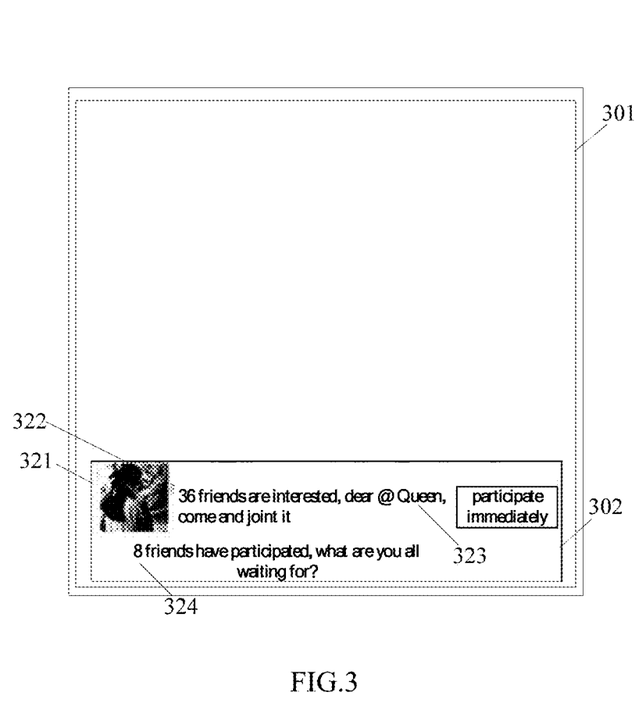
FIG. 3 is a schematic diagram illustrating a pause interface in which network media information and social element data of the network media information are combined and displayed according to some examples of the present disclosure.

FIG. 3 is another schematic diagram illustrating a pause interface in which network media information and social element data of the network media information are combined and displayed according to some examples of the present disclosure. As shown in FIG. 3, a social element display area 302 is at a designated location of the pause interface of the video, e.g., under a network media information display area 301 (which may be at another location, and is not limited in the present disclosure). The social element data and the preset template information corresponding to the network media information are displayed in the social element displaying area 302. The social element data includes attribute information of the current user, the number of the friends of the current user clicking the network media information. The template information in some examples is "T, D friends are interested, dear @B, Come and join it", wherein T is a head of the current user. If the current user has logged in, a terminal may obtain attribute information of the logged-in user, e.g., the head, the user name etc. The attribute information of the logged-in may be displayed on the pause interface. For example, the head of the current user is added at the location of T 321. B is the user name of the current user watching the video, and the user name of the user is added at the location of B 323. D is the number of friends of the current user clicking the network media information, and the obtained number of the friends of the current user clicking the network media information is added at the location of D 322. The template information may be preset by an administrator.

In addition, since the network media information displayed in the network media information display area 301 in FIG. 3 may be the information entity for the user participation, the number of the friends of the current user participating in the information entity and the preset template information 224 are further displayed in the social element display area 202, wherein the template information in this example is "E friends have participated, what are you all waiting for?", wherein E is the number of the friends of the current user participating in the information entity, the obtained number of the friends of the current user participating in the information entity is added at the location of E 324.

In addition, in some examples, the method may further include setting a privacy switch in the social element display area, setting a privacy switch state of the current logged-in user according to an operation instruction for the privacy switch. In particular, if the privacy switch is in an opened state, the attribute information is not displayed when the logged-in user watches the pause network media information of the video; if the privacy switch is in a closed state, the attribute information is displayed when the logged-in user watches the pause network media information of the video.

Figure 4:
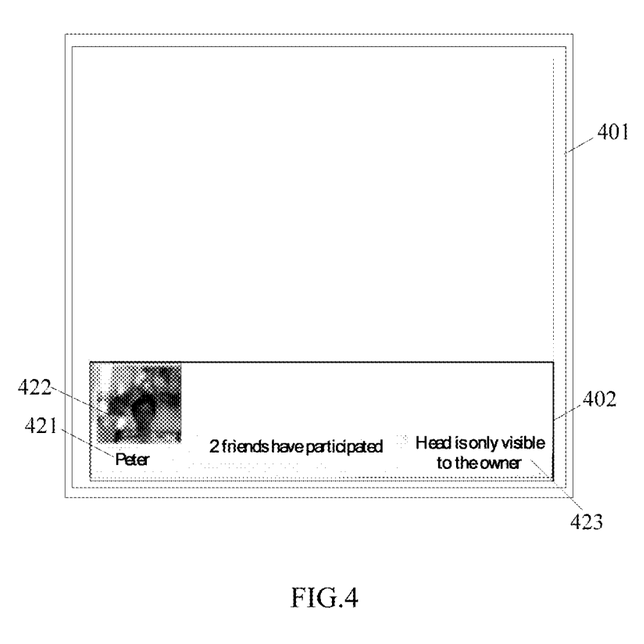
FIG. 4 is a schematic diagram illustrating a pause interface in which network media information and social element data of the network media information are combined and displayed, and a privacy switch is contained according to some examples of the present disclosure.

FIG. 4 is a schematic diagram illustrating a pause interface in which network media information and social element data of the network media information are combined and displayed, and a privacy switch is contained according to some examples of the present disclosure. As shown in FIG. 4, a social element display area 402 is at a designated location of a pause interface of the video, e.g., under a network media information displaying area 401 (the social element display area may be at another location, which is not limited in the present disclosure). Since the user has logged in, the user name 421 and the user head 422 are combined and displayed in the social element display area 402. A privacy switch 423 is further set in the social element display area 402. If the privacy switch 423 is clicked, the privacy switch of the current logged-in user is set as an opened state. And the attribute information of the logged-in user is not displayed in the network media information of the video, a default head in the system is used, and a user name is also not displayed. If the privacy switch 423 is clicked again, the privacy switch of the current logged-in user is set as a closed state. And the attribute information of the logged-in user is displayed when the current logged-in user watches the pause network media information of the video. In some examples, after the user clicks the privacy switch 423, a new privacy switch setting interface is opened, which includes privacy setting information, e.g., whether information (e.g., the head, the user name etc.) is displayed in the social element display area. If all options are set as false, the attribute information of the logged-in user is not displayed when the logged-in user watches the pause network media information of the video.

In some examples, the computing device transmits a network media information obtaining request to a network media information issuing background subsystem. The network media information issuing background subsystem receives the network media information obtaining request from the computing device, and returns the network media information to the computing device.

In some examples, the network media information obtaining request may include a identifier of a video. After the network media information issuing background subsystem receives the network media information obtaining request from the computing device, and returns the network media information corresponding to the video to the computing device.

The computing device transmits a social element data obtaining request to a social core algorithm subsystem. The social core algorithm subsystem receives the social element data obtaining request from the social core algorithm subsystem, wherein the social core algorithm subsystem includes a login state of the user. If the login state is that the user logs in the website providing the video, the social core algorithm subsystem returns the social element data related to the user to the computing device. If the login state is that the user does not log in the website providing the video, the social core algorithm subsystem returns the general social element data to the computing device.

The computing device transmits a clicking request to a data statistics processing subsystem. The data statistics processing subsystem receives at least one clicking request from at least one computing device. For each of the at least one clicking request, if the clicking request indicates that the user clicks the network media information, statistics of the clicked network media information in the general social element data is collected; if the clicking request indicates that the user participates in the information entity, statistics of the number of users participating in the information entity in the general social element data is collected; if the clicking request includes an identifier of a user clicking the network media information, the identifier of the user clicking the network media information is recorded; if the clicking request includes an identifier of a user participating in the information entity, the identifier of the user participating in the information entity is recorded.

The network media information issuing background subsystem, the social core algorithm subsystem and the data statistics processing subsystem may be in a same hardware device, or may be in different hardware devices, which is not limited in the present disclosure.

Corresponding to the method above, the present disclosure further provides a network media information delivery controlling system, which is used to implement the method above.

Figure 5:
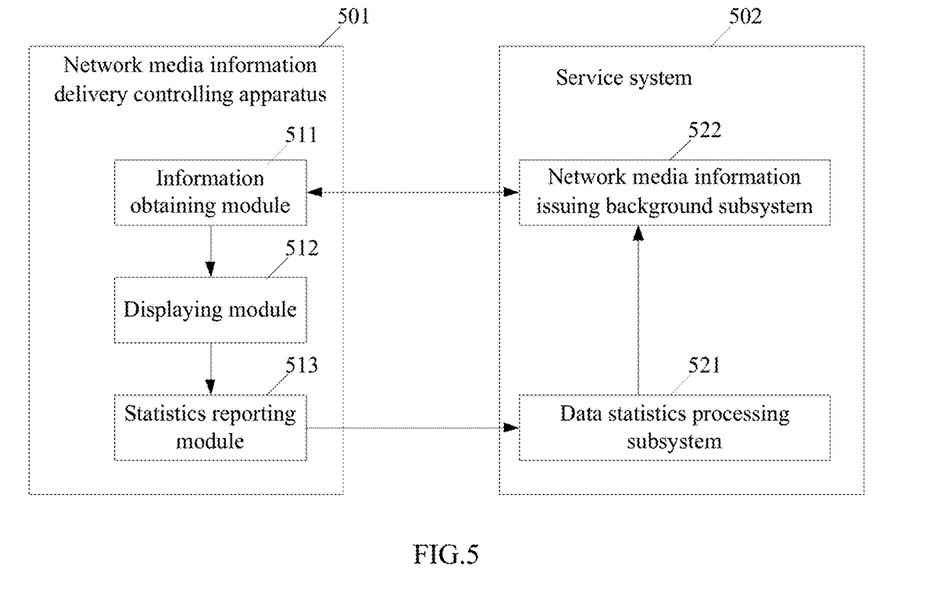
FIG. 5 is a schematic diagram illustrating a structure of a network media information delivery controlling system according to some examples of the present disclosure.

FIG. 5 is a schematic diagram illustrating a structure of a network media information delivery controlling system according to some examples of the present disclosure. As shown in FIG. 5, the system includes a network media information delivery controlling apparatus 501 and a corresponding service system 502. In detail, the network media information delivery controlling apparatus 501 includes modules as follows.

An information obtaining module 511 is to detect a pause operation for a video, transmit a request for obtaining corresponding network media information and social element data of the network media information after the pause operation is detected, and receive the returned network media information and the social element data.

A displaying module 512 is to combine the network media information with the social element data, display the combined network media information and the social element data on a pause interface of the video.

A statistics reporting module 513 is to report a clicking request after the network media information on the pause interface is clicked. And the statistics reporting module 513 is further to report an exposure request after the pause operation for the video is detected.

In some examples, the information obtaining module is to obtain the network media information after the pause operation for the video is detected, obtain the social element data corresponding to the network media information according to a login state of the user.

In some examples, the displaying module 512 is to display a social element display area at a designated location of the obtained network media information, display preset template information in the social element display area, and add the social element data into a corresponding location in the template information for display. A detail display effect is illustrated in FIGS. 2-4.

In some examples, the displaying module is to display the network media information in the network media display area on the pause interface of the video, select the corresponding template information according to a login state of the user, and add the social element data into a designated location in the template information for display.

In some examples, the social element data of the network media information includes the number of users clicking the network media information. If a target page of the network media information is an information entity for user participation, the social element data of the network media information includes the number of users clicking the network media information and/or the number of users participating in the information entity.

In some examples, the social element data includes social element data related to the user or general social element data. The general social element data includes the number of users clicking the network media information. If the target page of the target media information includes the information entity for user participation, the general social element data includes the number of the users clicking the network media information and/or the number of the users participating in the information entity. The social element data related to the user includes user attribute information and the number of friends clicking the network media information. If the target page of the target media information includes the information entity for the user participation, the general social element data further includes the number of friends participating in the information entity.

In some examples, the information obtaining module is to obtain the social element data related to the user if the login status is that the user logs in the website providing the video, obtain the general social element data if the login status is that the user does not log in the website providing the video.

In some examples, the displaying module 512 is further to when the social element data is combined and displayed, determine whether the user watching the current video logs in; if not, display the number of users clicking the network media information and/or the number of users participating in the information entity; if yes, initiate a request for obtaining a relationship chain of the logged-in user, transmit the request to a social core algorithm subsystem in the service system 502; initiate a request for querying the number of friends clicking the network media information and/or the number of friends participating in the information entity in the relationship chain after the relationship chain of the user is obtained, transmit the request to a data statistics processing subsystem in the service system 502, display the number of the friends clicking the network media information and/or the number of the friends participating in the information entity in the social element display area after the number of the friends clicking the network media information and/or the number of the friends participating in the information entity in the social element are obtained.

In some examples, the displaying module 512 is further to obtain the attribute information of the logged-in user if the user watching the current video logs in. In particular, the attribute information of the logged-in user is obtained from the social core algorithm subsystem in the service system 502, and is displayed on the pause interface of the video.

Figure 6:
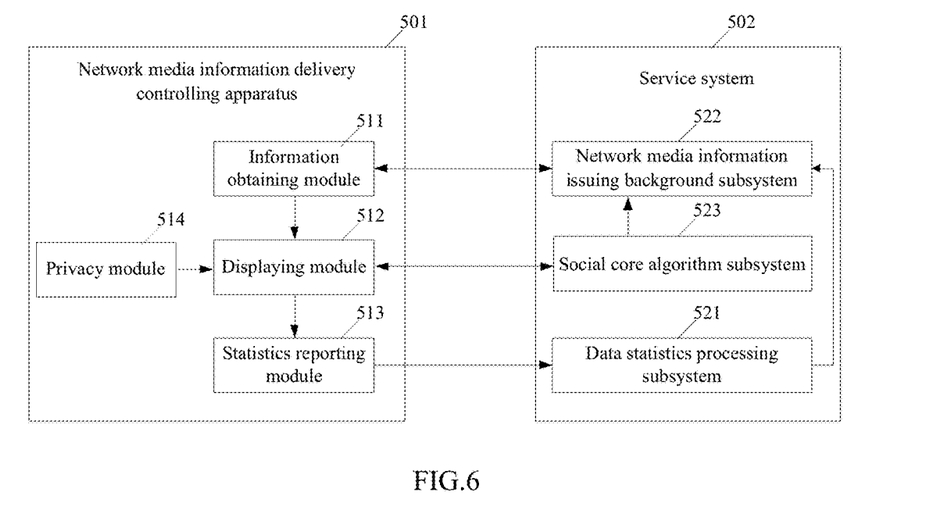
FIG. 6 is a schematic diagram illustrating a structure of a network media information delivery controlling system according to some examples of the present disclosure.

FIG. 6 is a schematic diagram illustrating a structure of a network media information delivery controlling system according to some examples of the present disclosure. As shown in FIG. 6, the network media information delivery controlling apparatus 501 further includes a privacy module 514, to set a privacy switch in the social element display area, set a state of the privacy switch for the current logged-in user. The displaying module 512 is further to if the privacy switch for the current logged-in user is in an opened state, not display the attribute information of the current logged-in user when the user watches the network media information of the video, if the privacy switch for the current logged-in user is in a closed state, display the attribute information of the current logged-in user when the user watches the network media information of the video.

As shown in FIG. 5, corresponding to the network media information delivery controlling apparatus, the service system 502 includes subsystems as follows.

A data statistics processing subsystem 521 is to receive a network media information clicking request to collect statistics of the social element data of the network media information, receive a network media information exposure request to collect statistics of an exposure amount of the network media information.

A network media information issuing background subsystem 522, to receive a request for obtaining the network media information and the social element data of the network media information, and return the network media information and the social element data to a requesting party.

In some examples, the social element data of the network media information includes the number of users clicking the network media information. If a target page of the network media information is an information entity for user participation, the social element data of the network media information includes the number of users clicking the network media information and/or the number of users participating in the information entity. Thus, the data statistics processing subsystem 521 is to receive a network media information clicking request to collect statistics of the number of users clicking the network media information, receive participation data of the information entity in the target page of the network media information to collect statistics of the number of users participating in the information entity.

As shown in FIG. 6, the service system 502 further includes a social core algorithm subsystem 523, to receive a request for obtaining a relationship chain data of the logged-in user, return the relationship chain data of the logged-in user. The social core algorithm subsystem 523 is further to transmit the relationship chain data to the network media information issuing background subsystem 522. The relationship chain data includes such as attribute information of the user, e.g., a head, a user name (a user nickname), friend information of the user.

In some example, the social core algorithm subsystem 523 is to receive a social element data obtaining request, wherein the social element data obtaining request includes a login status of the user, return the social element data related to the user to the computing device if the login status is that the user logs in the website providing the video, return the general social element data to the computing device if the login status is that the user does not log in the website providing the video.

In some examples, the data statistics processing subsystem 521 is further to record an identifier of a user clicking the network media information, is further to record an identifier of a user participating in the information entity if the target page of the network media information is the information entity for the user participation; receive a request for querying the number of friends clicking the network media information and/or the number of friends participating in the information entity in the relationship chain data, collect statistics of the number of the friends clicking the network media information and/or the number of the friends participating in the information entity in the relationship chain data, return the number of friends clicking the network media information and/or the number of friends participating in the information entity in the relationship chain data to the network media information issuing background subsystem 522, and the network media information issuing background subsystem returns the number of the friends clicking the network media information and/or the number of the friends participating in the information entity to the requesting party.

In some examples, the social data statistical processing subsystem 522 is to receive at least one clicking request from at least one computing device, for each clicking request, collect statistics of the clicked network media information in the general social element data if the clicking request indicates that the user clicks the network media information, collect statistics of the number of users participating in the network media information in the general social element data if the clicking request indicates that the user participates in the information entity, record an identifier of a user clicking the network media information if the clicking request includes the identifier of the user clicking the network media information, and record an identifier of a user participating in the information entity if the clicking request includes the identifier of the user participating in the information entity.

The data statistics processing subsystem 521, the network media information issuing background subsystem 522 and the social core algorithm subsystem 523 may be in a same hardware device, or may be in different hardware devices, which is not limited in the present disclosure.

According to the method and the apparatus provided in some examples of the present disclosure, the network media information and social element data corresponding to the network media information are obtained after a pause operation for a video is detected; and the network media information and the social element data corresponding to the network media information are combined and displayed on a pause interface of the video. Thus, it is avoided to blindly click the network media information and/or to blindly participate in the network media information, and occupancy for machine resources (e.g., storage resources, computing resources etc.) and occupancy for network resources (e.g., bandwidth resources, network device resources etc.) are further reduced, and waste for the machines and the network resources are reduced.

Further, the way of combining the network media information and the social element can comprehensively adopt advantages of the two kinds of network media network media information, thus, users can be attracted to participate in the network media information, impression for the network media information is deepened, further, the network media information can be fast broadcasted in suitable people, so as to improve attention of the user for the pause network media information of the video.

The network media information processing technology according to the present disclosure can be used in many industrial fields, e.g., an internet advertisement processing and displaying field, where the internet advertisement can be taken as a kind of network media information.

The present disclosure can apply to an internet video advertisement field, by combining the video advertisement and the social element, advantages of the two kinds of advertisements can comprehensively adopted, thus, users can be attracted to participate in the advertisements, impression for brands in the advertisements is deepened, further, the advertisement information can be fast broadcasted in suitable people. Further, privacy protection mechanism is introduced, security of the user information is ensured, user experience is improved, and impact of contradictions between the usage of the user information and the protection of the user information is avoided.

In addition, according to some examples of the present disclosure, various function modules may be integrated into a processing entity, or may be separately deployed in physical. The integrated entity above can be implemented through hardware, or can be implemented through a software functional entity. The function modules in some examples can be located in a terminal or network point, or may be distributed to multiple terminal or network points.

In addition, data processing program executed by a data processing machine, e.g., a computer, can be used to implement each example of the present disclosure. Apparently, the data processing program constitutes the present disclosure. In addition, the data processing program stored in a storage medium can be executed by directly reading the program from the storage medium or by copy or install the program into a storage device of data processing device (e.g., a Hard disk and/or a memory). Thus, the storage medium constitutes the present disclosure. The storage medium can use any type of recording way, e.g., a paper storage medium (such as paper tape, etc.), magnetic storage medium, such as a floppy disk, hard disk, flash memory, optical storage media (such as CD-ROM, etc.), magneto optical storage medium (such as MO, etc.)

The present disclosure further provides a storage medium, which stores the data processing program, the data processing program is used to execute procedures of the method above in some examples of the present disclosure.

Figure 7:
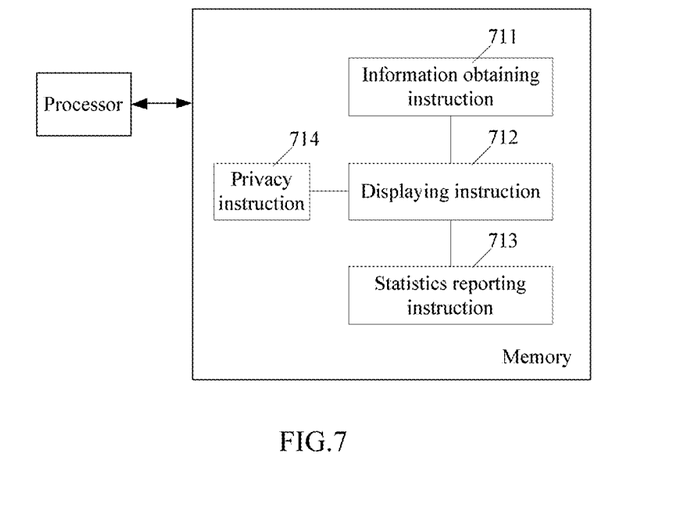
FIG. 7 is a schematic diagram illustrating a structure of a network media information delivery controlling system according to some examples of the present disclosure.

FIG. 7 is a schematic diagram illustrating a structure of a network media information delivery controlling system according to some examples of the present disclosure. As shown in FIG. 7, the apparatus at least includes a memory and a processor communicating with the memory, wherein the memory includes an information obtaining instruction 711 and a displaying instruction 712 executed by the processor.

The information obtaining instruction 711 is to obtain network media information after a pause operation for a video is detected, obtain social element data corresponding to the network media information according to a login state of a user.

The displaying instruction 712 is to display the network media information and the social element data corresponding to the network media information on a pause interface of the video.

In some examples, the social element data comprises social element data related to the user or general social element data.

The information obtaining instruction 711 is to obtain the social element data related to the user when the login state is that the user logs in a website providing the video; obtain the general social element data when the login state is that the user does not log in the website providing the video.

In some examples, the general social element data comprises the number of users clicking the network media information.

If a target page of the network media information includes an information entity for user participation, the general social element data comprises the number of users clicking the network media information and/or the number of users participating in the information entity. The social element data related to the user comprises user attribute information, the number of friends clicking the network media information. If a target page of the network media information includes the information entity for user participation, the social element data related to the user further comprises the number of friends participating in the information entity.

In some examples, the displaying instruction 712 is to display the network media information in a network media information display area; select corresponding template information according to the login status of the user; add the obtained social element data into a designated location in the template information for display.

In some examples, the apparatus further includes a privacy instruction 714. The privacy instruction 714 is to set a privacy switch in a social element display area; set a privacy switch state of the current logged-in user according to an operation instruction for the privacy switch from the user; when the privacy switch is in an opened state, not displaying attribute information of the logged-in user when the user watches the pause network media information of the video; when the privacy switch is in a closed state, displaying the attribute information of the logged-in user when the user watches the pause network media information of the video.

In some examples, the apparatus further includes a statistics reporting instruction 713. The statistics reporting instruction 713 is to report a clicking request after the network media information in the pause interface is clicked.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A network media information delivery controlling method, comprising:
   collecting, by a computing device, statistics of social element data of network media information;
   obtaining, by the computing device, the network media information after a pause operation for a video is detected;
   obtaining, by the computing device, the social element data corresponding to the network media information according to a login state of a user; and
   displaying, by the computing device, the network media information and the social element data corresponding to the network media information on a pause interface of the video;
   wherein the social element data comprises social element data related to the user or general social element data;
   the process of obtaining the social element data corresponding to the network media information according to the login state of a user comprises:

obtaining the social element data related to the user when the login state is that the user logs in a website providing the video, wherein the social element data related to the user comprises user attribute information and the number of friends clicking the network media information;

obtaining the general social element data when the login state is that the user does not log in the website providing the video, wherein the general social element data comprises the number of users clicking the network media information.

2. The method of claim 1, wherein when a target page of the network media information includes an information entity for user participation, the general social element data further comprises the number of users participating in the information entity;

when a target page of the network media information includes the information entity for user participation, the social element data related to the user further comprises the number of friends participating in the information entity.

3. The method of claim 1, wherein displaying the network media information and the social element data corresponding to the network media information on the pause interface of the video comprises:

displaying, by the computing device, the network media information in a network media information display area;

selecting, by the computing device, corresponding template information according to the login state of the user; and adding, by the computing device, the obtained social element data into a designated location in the template information.

4. The method of claim 1, further comprising:

setting, by the computing device, a privacy switch in a social element display area;

setting, by the computing device, a privacy switch state of the current logged-in user according to an operation instruction for the privacy switch from the user;

when the privacy switch is in an opened state, not displaying attribute information of the logged-in user in the social element data related to the logged-in user when the social element data related to the logged-in user is displayed on the pause interface of the video; and when the privacy switch is in a closed state, displaying the attribute information of the logged-in user in the social element data related to the logged-in user when the social element data related to the logged-in user is displayed on the pause interface of the video.

5. The method of claim 1, further comprising:

receiving, by a network media information issuing background subsystem, a network media information obtaining request from the computing device; and returning, by the network media information issuing background subsystem, the network media information to the computing device.

6. The method of claim 1, further comprising:

receiving, by a social core algorithm subsystem, a social element data obtaining request from the computing device, wherein the social element data obtaining request includes the login state of the user;

when the login state is that the user logs in the website providing the video, returning, by the social core algorithm subsystem, the social element data related to the user to the computing device; and when the login state is that the user does not log in the website providing the video, returning, by the social core algorithm subsystem, the general social element data to the computing device.

7. The method of claim 1, wherein said collecting statistics of the social element data of the network media information comprises:

receiving, by a data statistics processing subsystem, at least one clicking request from at least one computing device;

for each of the at least one clicking request, when the clicking request indicates that the user clicks the network media information, collecting statistics of the number of users clicking the network media information in the general social element data;

when the clicking request indicates that the user participates in the information entity, collecting statistics of the number of users participating in the network media information in the general social element data;

when the clicking request includes an identifier of a user clicking the network media information, recording the identifier of the user clicking the network media information; and when the clicking request includes an identifier of a user participating in the information entity, recording the identifier of the user participating in the information entity.

8. A network media information delivery controlling apparatus comprising:

one or more processors;

a memory;

wherein the memory stores one or more computer readable instructions that when executed by the one or more processors causes the one or more processors to:

collect statistics of social element data of network media information;

obtain the network media information after a pause operation for a video is detected, obtain the social element data corresponding to the network media information according to a login state of a user; and display the network media information and the social element data corresponding to the network media information on a pause interface of the video;

wherein the social element data comprises social element data related to the user or general social element data;

the processor executes the computer readable instructions stored in the memory to obtain the social element data related to the user when the login state is that the user logs in a website providing the video, wherein the social element data related to the user comprises user attribute information, the number of friends clicking the network media information; obtain the general social element data when the login state is that the user does not log in the website providing the video, wherein the general social element data comprises the number of users clicking the network media information.

9. The apparatus of claim 8, wherein when a target page of the network media information includes an information entity for user participation, the general social element data further comprises the number of users participating in the information entity; and when a target page of the network media information includes the information entity for user participation, the social element data related to the user further comprises the number of friends participating in the information entity.

10. The apparatus of claim 8, wherein the computer readable instructions when executed by the one or more processors causes the one or more processors to display the network media information in a network media information display area; select corresponding template information according to the login status of the user; add the obtained social element data into a designated location in the template information.

11. The apparatus of claim 8, wherein the computer readable instructions when executed by the one or more processors causes the one or more processors to further:
set a privacy switch in a social element display area; set a privacy switch state of the current logged-in user according to an operation instruction for the privacy switch from the user; when the privacy switch is in an opened state, not displaying attribute information of the logged-in user in the social element data related to the logged-in user when the social element data related to the logged-in user is displayed on the pause interface of the video; and when the privacy switch is in a closed state, displaying the attribute information of the logged-in user in the social element data related to the logged-in user when the social element data related to the logged-in user is displayed on the pause interface of the video.

12. The apparatus of claim 8, wherein the computer readable instructions when executed by the one or more processors causes the one or more processors to further
report a clicking request after the network media information in the pause interface is clicked.

13. A non-transitory computer readable storage medium storing instructions to:
collect statistics of social element data of network media information;
obtain the network media information after a pause operation for a video is detected;
obtain the social element data corresponding to the network media information according to a login status of a user; and
display the network media information and the social element data corresponding to the network media information on a pause interface of the video;
wherein the social element data comprises social element data related to the user or general social element data;
the non-transitory computer readable storage medium storing further instructions to:
obtain the social element data related to the user when the login state is that the user logs in a website providing the video, wherein the social element data related to the user comprises user attribute information, the number of friends clicking the network media information; and
obtain the general social element data when the login state is that the user does not log in the website providing the video, wherein the general social element data comprises the number of users clicking the network media information.

14. The non-transitory computer readable storage medium of claim 13, wherein when a target page of the network media information includes an information entity for user participation, the general social element data further comprises the number of users participating in the information entity; and
when a target page of the network media information includes the information entity for user participation, the social element data related to the user further comprises the number of friends participating in the information entity.

15. The non-transitory computer readable storage medium of claim 13, storing further instructions to:
display the network media information in a network media information display area;
select corresponding template information according to the login status of the user; and
add the obtained social element data into a designated location in the template information.

16. The non-transitory computer readable storage medium of claim 13 storing further instructions to:
set a privacy switch in a social element display area;
set a privacy switch state of the current logged-in user according to an operation instruction for the privacy switch from the user;
when the privacy switch is in an opened state, not display attribute information of the logged-in user in the social element data related to the logged-in user when the social element data related to the logged-in user is displayed on the pause interface of the video; and
when the privacy switch is in a closed state, display the attribute information of the logged-in user in the social element data related to the logged-in user when the social element data related to the logged-in user is displayed on the pause interface of the video.

\* \* \* \* \*